US012569787B2

(12) United States Patent (10) Patent No.: US 12,569,787 B2
Wu (45) Date of Patent: Mar. 10, 2026

(54) MULTI-PLATE OR LAMINATED SCREW PRESS

(71) Applicant: Yunping Wu, Fuzhou (CN)

(72) Inventor: Yunping Wu, Fuzhou (CN)

( * ) Notice: Subject to any disclaimer, the term of this patent is extended or adjusted under 35 U.S.C. 154(b) by 497 days.

(21) Appl. No.: 17/901,087

(22) Filed: Sep. 1, 2022

(65) Prior Publication Data

US 2023/0065734 A1 Mar. 2, 2023

(30) Foreign Application Priority Data

Sep. 2, 2021 (CN) .......................... 202122105634.1

(51) Int. Cl.
B01D 29/74 (2006.01)
B01D 29/64 (2006.01)
B01D 29/94 (2006.01)

(52) U.S. Cl.
CPC ......... B01D 29/74 (2013.01); B01D 29/6438 (2013.01); B01D 29/94 (2013.01); *B01D 2201/081* (2013.01)

(58) Field of Classification Search
None
See application file for complete search history.

(56) References Cited

U.S. PATENT DOCUMENTS 647,354 A * 4/1900 Anderson ............... B30B 15/08
100/98 R
1,015,371 A * 1/1912 Wolfe .................... B30B 9/128
100/150

1,069,404 A * 8/1913 Fiddyment ............... B30B 9/16
100/146
1,233,930 A * 7/1917 Strickland ............... B30B 9/26
100/145
1,297,901 A * 3/1919 Peerson ............... B30B 15/08
100/98 R
1,366,307 A * 1/1921 Ten Bosch ............... B30B 9/26
100/324
1,545,818 A * 7/1925 Elfstrum ............... B30B 9/062
100/98 R
1,564,585 A * 12/1925 Krause ............... A01F 12/442
209/386
1,594,999 A * 8/1926 Carter ............... B01D 36/02
210/403

(Continued)

FOREIGN PATENT DOCUMENTS

CA 3035673 A1 * 10/2018 ............... B30B 9/00
CN 101417854 A * 4/2009

(Continued)

*Primary Examiner* — Robert J Popovics

(57) ABSTRACT

A laminated spiral dewatering equipment, including a filtration cavity, a spiral shaft, a driving device and multiple supporting plates. The supporting plates are configured to support and position the filtration cavity, the spiral shaft and the driving device. The spiral shaft is penetratedly arranged in the filtration cavity. The filtration cavity includes a first closed ring piece group and a second closed ring piece group. A primary driving rod of the driving device is arranged above the filtration cavity, and is configured to drive an upper end of the first closed ring piece group to circumferentially reciprocate, and a lower end of the first closed ring piece group to perform a up-down reciprocating linear motion.

8 Claims, 21 Drawing Sheets

(56)                 References Cited

U.S. PATENT DOCUMENTS

| | | | | | |
|---|---|---|---|---|---|
| 1,700,407 A | * | 1/1929 | Hiller | B30B 9/12 | 100/98 R |
| 1,700,565 A | * | 1/1929 | Walter | B30B 9/26 | 100/90 |
| 1,722,814 A | * | 7/1929 | Meakin | B30B 9/26 | 100/252 |
| 1,739,459 A | * | 12/1929 | Hiller | B30B 9/267 | 100/98 R |
| 1,765,389 A | * | 6/1930 | Wendler | B30B 9/12 | 100/110 |
| 1,772,262 A | * | 8/1930 | Naugle | B01D 29/828 | 210/488 |
| 1,828,968 A | * | 10/1931 | Hiller | B30B 9/12 | 100/98 R |
| 2,119,162 A | * | 5/1938 | Hartner | B30B 9/16 | 366/186 |
| 2,149,736 A | * | 3/1939 | Hiller | B30B 9/127 | 100/129 |
| 2,312,764 A | * | 3/1943 | Lubke | B01D 35/28 | 210/415 |
| 2,360,984 A | * | 10/1944 | Schmitz, Jr. | B30B 9/16 | 100/146 |
| 2,687,084 A | * | 8/1954 | Bowman | B30B 9/267 | 100/340 |
| 3,003,412 A | * | 10/1961 | Vincent | B30B 9/12 | 100/148 |
| 3,021,782 A | * | 2/1962 | Ginaven | D21C 9/18 | 241/301 |
| 3,111,082 A | * | 11/1963 | Larsson | B01D 29/82 | 100/147 |
| 3,126,818 A | * | 3/1964 | Koelsch | B30B 9/121 | 100/150 |
| 3,215,355 A | * | 11/1965 | Shouvlin | D21D 1/30 | 100/146 |
| 3,394,649 A | * | 7/1968 | Kemper | B30B 9/18 | 100/126 |
| 3,460,466 A | * | 8/1969 | Adams | D21D 5/02 | 100/146 |
| 3,461,793 A | * | 8/1969 | Solberg | B30B 9/16 | 100/146 |
| 3,549,000 A | * | 12/1970 | Christian | B65G 45/005 | 198/659 |
| 3,574,891 A | * | 4/1971 | Bredeson | B29C 48/395 | 100/129 |
| 3,580,389 A | * | 5/1971 | Nonnenmacher | F04C 2/16 | 198/675 |
| 3,585,924 A | * | 6/1971 | Nolan | B01D 29/902 | 100/95 |
| 3,592,128 A | * | 7/1971 | French | B30B 9/121 | 100/150 |
| 3,662,679 A | * | 5/1972 | Braten | B30B 9/12 | 100/145 |
| 3,688,687 A | * | 9/1972 | Craig | B30B 9/128 | 100/145 |
| 3,695,173 A | * | 10/1972 | Cox | B30B 9/12 | 210/414 |
| 3,780,645 A | * | 12/1973 | Farmer | B30B 9/163 | 100/147 |
| 3,802,566 A | * | 4/1974 | Hata | B01D 29/828 | 210/383 |
| 3,938,434 A | * | 2/1976 | Cox | B30B 9/12 | 100/145 |
| 3,982,483 A | * | 9/1976 | Bird | B30B 9/26 | 100/148 |
| 4,002,559 A | * | 1/1977 | Paterson | B07B 11/06 | 100/106 |
| 4,025,001 A | * | 5/1977 | Yarem | A22C 17/04 | 241/74 |
| 4,041,854 A | * | 8/1977 | Cox | B30B 9/12 | 100/145 |
| 4,069,980 A | * | 1/1978 | Yarem | A22C 17/04 | 241/74 |
| 4,117,776 A | * | 10/1978 | Hunt | B30B 9/18 | 100/98 R |
| 4,160,732 A | * | 7/1979 | Maffet | B01D 29/6476 | 210/780 |
| 4,214,377 A | * | 7/1980 | Maffet | F26B 5/14 | 210/767 |
| 4,237,618 A | * | 12/1980 | Maffet | B30B 9/12 | 100/117 |
| 4,266,473 A | * | 5/1981 | Hunt | B30B 9/12 | 100/193 |
| 4,279,197 A | * | 7/1981 | Hunt | B30B 9/125 | 100/98 R |
| 4,279,750 A | * | 7/1981 | Hori | B01D 29/90 | 210/357 |
| 4,280,907 A | * | 7/1981 | Haberle | B29C 48/6945 | 425/197 |
| 4,286,512 A | * | 9/1981 | Berggren | B30B 9/12 | 100/74 |
| 4,291,619 A | * | 9/1981 | Hunt | B30B 9/18 | 100/98 R |
| 4,297,943 A | * | 11/1981 | Laurich-Trost | B30B 9/26 | 100/129 |
| 4,316,368 A | * | 2/1982 | Van Pelt | B01D 33/763 | 62/542 |
| 4,340,184 A | * | 7/1982 | Poss | A22C 17/04 | 241/82.3 |
| 4,364,664 A | * | 12/1982 | Theysohn | B29C 48/682 | 100/146 |
| 4,384,955 A | * | 5/1983 | Nakakura | B30B 9/26 | 100/150 |
| 4,397,230 A | * | 8/1983 | Hunt | B30B 9/12 | 100/45 |
| 4,446,788 A | * | 5/1984 | Molnar | B30B 11/241 | 100/129 |
| 4,467,717 A | * | 8/1984 | Yamamoto | B30B 9/12 | 100/117 |
| 4,565,124 A | * | 1/1986 | Stautland | B30B 9/16 | 100/146 |
| 4,585,553 A | * | 4/1986 | Hikosaka | B03C 1/30 | 210/111 |
| 4,644,861 A | * | 2/1987 | Mansfield | B30B 9/12 | 100/145 |
| 4,709,628 A | * | 12/1987 | Glowacki | B30B 9/18 | 100/148 |
| 4,718,337 A | * | 1/1988 | Wiederkehr | B30B 9/125 | 100/193 |
| 4,741,836 A | * | 5/1988 | Jackman | C02F 11/125 | 210/729 |
| 4,755,291 A | * | 7/1988 | Lee | B01D 33/66 | 100/340 |
| 4,779,528 A | * | 10/1988 | Bruke | B30B 9/12 | 100/145 |
| 4,781,823 A | * | 11/1988 | Shinozaki | B01D 29/03 | 100/138 |
| 5,009,795 A | * | 4/1991 | Eichler | A23J 3/346 | 210/488 |
| 5,137,489 A | * | 8/1992 | Boster | B30B 9/122 | 100/127 |
| 5,156,735 A | * | 10/1992 | Pecci | B01D 29/25 | 210/488 |
| 5,160,428 A | * | 11/1992 | Kuri | B01D 29/60 | 210/111 |
| 5,205,930 A | * | 4/1993 | Obrestad | B01D 29/828 | 210/414 |
| 5,333,556 A | * | 8/1994 | Isobe | B30B 9/26 | 366/147 |
| 5,380,436 A | * | 1/1995 | Sasaki | B30B 9/26 | 210/383 |
| 5,417,155 A | * | 5/1995 | Tatsuzawa | B30B 9/26 | 100/146 |
| 5,435,917 A | * | 7/1995 | Sato | B01D 33/801 | 209/288 |
| 5,476,550 A | * | 12/1995 | Walker | B30B 9/128 | 100/145 |
| 5,516,427 A | * | 5/1996 | Yoshikawa | B01D 33/742 | 210/415 |

(56) References Cited

U.S. PATENT DOCUMENTS

| | | | | |
|---|---|---|---|---|
| 5,526,740 | A * | 6/1996 | Lee | B01D 33/11 |
| | | | | 134/132 |
| 5,653,879 | A * | 8/1997 | Schroeder | B01D 29/6476 |
| | | | | 210/365 |
| 5,732,618 | A * | 3/1998 | Buehl | B30B 9/12 |
| | | | | 100/145 |
| 5,743,178 | A * | 4/1998 | Babbini | B30B 9/16 |
| | | | | 100/145 |
| 5,833,851 | A * | 11/1998 | Adams | B01D 29/828 |
| | | | | 210/791 |
| 5,845,764 | A * | 12/1998 | Ommundsen | B30B 11/246 |
| | | | | 198/677 |
| 5,857,406 | A * | 1/1999 | Scheucher | B30B 9/121 |
| | | | | 100/145 |
| 5,865,113 | A * | 2/1999 | Weber | B30B 9/327 |
| | | | | 100/98 R |
| 5,967,335 | A * | 10/1999 | Clarstrom | B01D 29/15 |
| | | | | 209/385 |
| 6,139,685 | A * | 10/2000 | Saito | D21C 9/18 |
| | | | | 162/57 |
| 6,241,902 | B1 * | 6/2001 | Huebner | B30B 9/12 |
| | | | | 210/791 |
| 6,258,262 | B1 * | 7/2001 | Katabe | B30B 9/26 |
| | | | | 210/402 |
| 6,338,411 | B1 * | 1/2002 | Katabe | B01D 29/46 |
| | | | | 210/488 |
| 6,395,187 | B1 * | 5/2002 | Alanis | B01D 29/6484 |
| | | | | 100/145 |
| 6,451,213 | B2 * | 9/2002 | Huebner | F26B 11/0481 |
| | | | | 210/791 |
| 6,520,073 | B1 * | 2/2003 | Sorensen | B01D 33/39 |
| | | | | 100/37 |
| 6,536,602 | B2 * | 3/2003 | Ruescher | B01D 29/6476 |
| | | | | 210/414 |
| 6,550,376 | B2 * | 4/2003 | Johnston | B30B 9/122 |
| | | | | 100/126 |
| 6,588,331 | B2 * | 7/2003 | Thibodeau | B30B 9/12 |
| | | | | 100/126 |
| 6,615,710 | B1 * | 9/2003 | Ishigaki | B01D 29/60 |
| | | | | 100/48 |
| 6,634,508 | B1 * | 10/2003 | Ishigaki | B30B 9/12 |
| | | | | 210/414 |
| 6,651,822 | B2 * | 11/2003 | Alanis | B01D 29/6476 |
| | | | | 100/145 |
| 6,736,054 | B2 * | 5/2004 | Dionne | B30B 9/121 |
| | | | | 100/112 |
| 6,910,411 | B2 * | 6/2005 | Reddoch | B30B 9/18 |
| | | | | 100/106 |
| 6,925,929 | B2 * | 8/2005 | Dionne | B30B 9/12 |
| | | | | 100/112 |
| 7,166,229 | B2 * | 1/2007 | Cote | B01D 33/644 |
| | | | | 210/741 |
| 7,191,700 | B2 * | 3/2007 | Sasaki | B30B 9/26 |
| | | | | 210/415 |
| 7,267,049 | B2 * | 9/2007 | Babbini | B30B 9/26 |
| | | | | 100/146 |
| 7,344,033 | B2 * | 3/2008 | Sasaki | B01D 29/46 |
| | | | | 100/129 |
| 7,347,140 | B2 * | 3/2008 | Scheucher | B30B 9/121 |
| | | | | 100/127 |
| 7,357,074 | B2 * | 4/2008 | Kraft | B30B 9/121 |
| | | | | 100/145 |
| 7,383,766 | B2 * | 6/2008 | McIntosh | B30B 9/065 |
| | | | | 44/550 |
| 7,410,568 | B2 * | 8/2008 | Christopherson | B30B 9/125 |
| | | | | 210/111 |
| 7,461,591 | B2 * | 12/2008 | Babbini | B30B 9/16 |
| | | | | 100/131 |
| 7,470,365 | B2 * | 12/2008 | Hong | C02F 1/5236 |
| | | | | 210/488 |
| 7,767,173 | B2 * | 8/2010 | Hamano | B01D 29/46 |
| | | | | 422/273 |
| 7,918,347 | B2 * | 4/2011 | Geisbauer | B01D 33/648 |
| | | | | 210/393 |
| 8,017,021 | B1 * | 9/2011 | Staples | B02C 23/02 |
| | | | | 241/78 |
| 8,333,282 | B2 * | 12/2012 | Pallmann | B30B 9/26 |
| | | | | 210/415 |
| 8,596,195 | B2 * | 12/2013 | Hong | B30B 9/26 |
| | | | | 100/117 |
| 8,661,972 | B2 * | 3/2014 | Czwaluk | B30B 9/12 |
| | | | | 210/232 |
| 8,739,963 | B2 * | 6/2014 | Nickerson | B65G 33/18 |
| | | | | 198/604 |
| 8,746,138 | B2 * | 6/2014 | Lehoux | D21C 7/00 |
| | | | | 210/488 |
| 8,772,020 | B2 * | 7/2014 | Konwinski | C12M 45/06 |
| | | | | 435/243 |
| 8,985,011 | B2 * | 3/2015 | Klass, Sr. | B01D 29/90 |
| | | | | 100/117 |
| 8,985,313 | B2 * | 3/2015 | Moriyama | B65G 33/30 |
| | | | | 198/662 |
| 9,003,968 | B2 * | 4/2015 | Kozanda | B30B 9/12 |
| | | | | 100/106 |
| 9,101,861 | B2 * | 8/2015 | Courtemanche | B01D 29/445 |
| 9,131,667 | B2 * | 9/2015 | Carew | B01D 3/141 |
| 9,138,956 | B2 * | 9/2015 | Czwaluk | B30B 9/18 |
| 9,162,411 | B2 * | 10/2015 | Czwaluk | B30B 9/26 |
| 9,269,976 | B2 * | 2/2016 | Carew | B01D 29/23 |
| 9,290,330 | B2 * | 3/2016 | Nickerson | B65G 33/18 |
| 9,352,253 | B2 * | 5/2016 | Lehoux | B30B 9/267 |
| 9,358,482 | B2 * | 6/2016 | Morgan | B01D 29/6476 |
| 9,358,484 | B2 * | 6/2016 | Tange | B01D 36/045 |
| 9,365,009 | B2 * | 6/2016 | Bollinger | B30B 9/067 |
| 9,381,711 | B2 * | 7/2016 | Oh | B30B 9/14 |
| 9,387,641 | B2 * | 7/2016 | Kaneko | B30B 9/16 |
| 9,409,106 | B2 * | 8/2016 | Levitt | B01D 29/117 |
| 9,409,365 | B2 * | 8/2016 | Doppstadt | B30B 11/246 |
| 9,434,551 | B2 * | 9/2016 | Mellander | D21C 7/06 |
| 9,561,978 | B2 * | 2/2017 | Theodoulou | B30B 9/12 |
| 9,643,110 | B2 * | 5/2017 | Lehoux | B30B 9/16 |
| 9,650,598 | B2 * | 5/2017 | Vogelsang | B65G 33/22 |
| 9,895,635 | B2 * | 2/2018 | Levitt | B01D 29/6415 |
| 9,968,873 | B2 * | 5/2018 | Tezuka | B01D 33/275 |
| 10,005,252 | B2 * | 6/2018 | Kanzler | B30B 9/122 |
| 10,040,008 | B2 * | 8/2018 | Roiss | B30B 9/26 |
| 10,118,358 | B2 * | 11/2018 | Houle | B30B 9/128 |
| 10,130,904 | B2 * | 11/2018 | Klass | B30B 9/121 |
| 10,179,301 | B2 * | 1/2019 | Bechtl | B30B 9/121 |
| 10,195,806 | B2 * | 2/2019 | Roiss | B30B 9/121 |
| 10,286,338 | B2 * | 5/2019 | Levitt | B01D 29/23 |
| 10,329,182 | B2 * | 6/2019 | Baxter | B01D 29/25 |
| 10,343,847 | B1 * | 7/2019 | Allard | B30B 9/26 |
| 10,457,008 | B2 * | 10/2019 | Boivin | B30B 9/26 |
| 10,486,383 | B1 * | 11/2019 | Allard | B30B 9/125 |
| 10,555,547 | B2 * | 2/2020 | Wenger | A23N 17/005 |
| 10,624,369 | B2 * | 4/2020 | Wenger | A23L 13/65 |
| 10,654,235 | B2 * | 5/2020 | Miller | C02F 11/125 |
| 10,703,062 | B2 * | 7/2020 | Oertig | B30B 9/12 |
| 10,736,340 | B1 * | 8/2020 | Rokey | A23K 10/30 |
| 10,745,310 | B2 * | 8/2020 | Hunt | B30B 9/125 |
| 10,780,664 | B2 * | 9/2020 | Boivin | B30B 9/127 |
| 10,786,763 | B2 * | 9/2020 | Bradt | B30B 9/16 |
| 10,850,217 | B2 * | 12/2020 | Wessels | B01D 29/23 |
| 10,850,465 | B2 * | 12/2020 | Lear | B30B 15/0082 |
| 10,870,250 | B2 * | 12/2020 | Ulm | B30B 9/26 |
| 10,919,249 | B2 * | 2/2021 | Mardikian | B30B 9/121 |
| 10,968,617 | B2 * | 4/2021 | Duperon | B01D 21/2461 |
| 11,034,603 | B2 * | 6/2021 | Sun | C02F 9/00 |
| 11,162,218 | B1 * | 11/2021 | Clayton | D21C 7/02 |
| 11,179,909 | B2 * | 11/2021 | Miller | B30B 9/18 |
| 11,219,849 | B2 * | 1/2022 | Nakano | C02F 11/122 |
| 11,225,041 | B2 * | 1/2022 | Sands | B30B 9/12 |
| 11,311,910 | B2 * | 4/2022 | Hai | B07B 1/55 |
| 11,524,253 | B2 * | 12/2022 | Moir | B30B 9/121 |
| 11,549,214 | B2 * | 1/2023 | Wagler | D21B 1/021 |
| 11,584,660 | B2 * | 2/2023 | Hall | B01D 29/828 |
| 11,607,634 | B2 * | 3/2023 | Frankman | B01D 35/16 |
| 11,655,175 | B2 * | 5/2023 | Sugawara | B30B 9/128 |
| | | | | 210/98 |

(56) References Cited

U.S. PATENT DOCUMENTS

| | | | | |
|---|---|---|---|---|
| 11,684,874 B2* | 6/2023 | Hong | B01D 29/46 | 210/335 |
| 11,718,057 B2* | 8/2023 | Mardikian | B30B 9/26 | 34/182 |
| 11,820,096 B2* | 11/2023 | Sun | C08L 71/02 | |
| 11,885,069 B2* | 1/2024 | Wagler | D21B 1/36 | |
| 11,925,880 B2* | 3/2024 | Baxter | B01D 21/009 | |
| 11,931,677 B2* | 3/2024 | Riedel | B01D 29/03 | |
| 12,024,448 B2* | 7/2024 | Wada | C02F 11/125 | |
| 12,083,763 B2* | 9/2024 | Formaggio | B30B 9/121 | |
| 12,128,334 B2* | 10/2024 | Chin | B01D 33/0183 | |
| 12,157,973 B2* | 12/2024 | Virtanen | D21B 1/12 | |
| 12,220,657 B2* | 2/2025 | Whitlock | B01D 29/41 | |
| 12,256,760 B2* | 3/2025 | Wenger | A23K 10/20 | |
| 12,257,588 B2* | 3/2025 | Leonard | B04B 1/20 | |
| 12,304,167 B2* | 5/2025 | Eugster | B30B 9/121 | |
| 12,304,926 B2* | 5/2025 | Ghorbani | C11B 1/10 | |
| 12,319,022 B2* | 6/2025 | Huang | B01D 29/111 | |
| 12,365,159 B2* | 7/2025 | Egger | G01F 13/005 | |
| 12,370,473 B2* | 7/2025 | Chan | B30B 9/26 | |
| 12,415,149 B2* | 9/2025 | Mueller | B01D 29/6476 | |
| 12,420,510 B2* | 9/2025 | Pan | B09B 3/35 | |
| 2001/0001457 A1* | 5/2001 | Huebner | F26B 11/0481 | 210/781 |
| 2002/0050214 A1* | 5/2002 | Thibodeau | B30B 9/12 | 100/127 |
| 2002/0096062 A1* | 7/2002 | Johnston | B30B 9/122 | 100/134 |
| 2002/0096460 A1* | 7/2002 | Ruescher | B01D 29/828 | 210/154 |
| 2004/0194646 A1* | 10/2004 | Dionne | B30B 9/12 | 100/110 |
| 2005/0172837 A1* | 8/2005 | Flor | B30B 9/12 | 100/110 |
| 2005/0193902 A1* | 9/2005 | Sasaki | B30B 9/16 | 100/110 |
| 2006/0037905 A1* | 2/2006 | Sasaki | B30B 9/16 | 210/488 |
| 2006/0288884 A1* | 12/2006 | Babbini | B30B 9/26 | 100/146 |
| 2007/0119313 A1* | 5/2007 | Hamano | B01D 29/46 | 100/117 |
| 2010/0084324 A1* | 4/2010 | Geisbauer | B01D 33/648 | 210/109 |
| 2012/0103920 A1* | 5/2012 | Morgan | B01D 35/26 | 210/791 |
| 2012/0118517 A1* | 5/2012 | Lehoux | C12P 7/10 | 210/337 |
| 2012/0312177 A1* | 12/2012 | Hong | B30B 9/262 | 100/117 |
| 2013/0062268 A1* | 3/2013 | Kaneko | B30B 9/121 | 210/228 |
| 2013/0264264 A1* | 10/2013 | Lehoux | B30B 11/24 | 210/231 |
| 2013/0277319 A1* | 10/2013 | Theodoulou | C02F 1/00 | 210/770 |
| 2014/0110324 A1* | 4/2014 | Lehoux | C12P 7/10 | 210/231 |
| 2014/0144823 A1* | 5/2014 | Marchesini | B30B 9/128 | 210/120 |
| 2014/0224136 A1* | 8/2014 | Bollinger | B30B 9/06 | 100/188 R |
| 2014/0326148 A1* | 11/2014 | Wootton | B30B 9/18 | 100/37 |
| 2015/0076085 A1* | 3/2015 | Theodoulou | B01D 29/35 | 210/791 |
| 2015/0108059 A1* | 4/2015 | Turchetti | B01D 29/682 | 210/408 |
| 2015/0276312 A1* | 10/2015 | Mardikian | F26B 7/00 | 34/61 |
| 2015/0336031 A1* | 11/2015 | Lehoux | B01D 25/12 | 210/231 |
| 2015/0343350 A1* | 12/2015 | Bradt | B01D 35/02 | 210/226 |
| 2016/0023132 A1* | 1/2016 | Bechtl | B01D 29/64 | 210/225 |
| 2016/0040358 A1* | 2/2016 | Boltersdorf | D21C 9/18 | 162/1 |
| 2016/0067637 A1* | 3/2016 | Roiss | B01D 29/111 | 210/405 |
| 2016/0096125 A1* | 4/2016 | Wright | B01D 29/96 | 210/359 |
| 2016/0355427 A1* | 12/2016 | Hong | C02F 11/125 | |
| 2017/0036410 A1* | 2/2017 | Boivin | B30B 9/121 | |
| 2017/0043548 A1* | 2/2017 | Boivin | B01D 29/111 | |
| 2017/0087788 A1* | 3/2017 | Oertig | B30B 9/12 | |
| 2017/0312658 A1* | 11/2017 | Bradt | B30B 9/124 | |
| 2018/0133625 A1* | 5/2018 | Lehoux | B30B 9/16 | |
| 2018/0154599 A1* | 6/2018 | Ulm | B30B 9/124 | |
| 2018/0170783 A1* | 6/2018 | Baxter | C02F 11/125 | |
| 2018/0170784 A1* | 6/2018 | Baxter | B01D 29/117 | |
| 2018/0172346 A1* | 6/2018 | Baxter | B01D 29/6476 | |
| 2018/0228183 A1* | 8/2018 | Wenger | A23L 13/52 | |
| 2018/0346362 A1* | 12/2018 | Sun | B01D 29/035 | |
| 2019/0023598 A1* | 1/2019 | Hunt | B30B 9/26 | |
| 2019/0075822 A1* | 3/2019 | Wenger | A23K 10/20 | |
| 2019/0143247 A1* | 5/2019 | Bradt | B30B 9/262 | 210/231 |
| 2019/0168139 A1* | 6/2019 | Wu | B01D 33/29 | |
| 2019/0263080 A1* | 8/2019 | Mardikian | B30B 9/16 | |
| 2019/0358568 A1* | 11/2019 | Frankman | B01D 35/16 | |
| 2019/0364929 A1* | 12/2019 | Wenger | A23N 17/005 | |
| 2020/0023601 A1* | 1/2020 | Houle | B30B 9/14 | |
| 2020/0086238 A1* | 3/2020 | Baxter | C07B 63/00 | |
| 2020/0298151 A1* | 9/2020 | Nakano | C02F 9/00 | |
| 2020/0368649 A1* | 11/2020 | Moir | B30B 9/121 | |
| 2020/0385974 A1* | 12/2020 | Duperon | E03F 5/105 | |
| 2021/0138369 A1* | 5/2021 | Wu | B01D 29/25 | |
| 2021/0236965 A1* | 8/2021 | Riedel | B01D 29/35 | |
| 2021/0253462 A1* | 8/2021 | Sun | B01D 29/6476 | |
| 2021/0300783 A1* | 9/2021 | Hall | C02F 11/125 | |
| 2022/0064044 A1* | 3/2022 | Wada | C02F 11/125 | |
| 2022/0203272 A1* | 6/2022 | Hong | B01D 29/46 | |
| 2022/0203273 A1* | 6/2022 | Wu | B01D 29/46 | |
| 2022/0204419 A1* | 6/2022 | de Groot | C05F 3/00 | |
| 2022/0219101 A1* | 7/2022 | Sabol | B01D 29/94 | |
| 2022/0347603 A1* | 11/2022 | Whitlock | B01D 25/26 | |
| 2023/0065734 A1* | 3/2023 | Wu | B01D 29/6476 | |
| 2023/0102465 A1* | 3/2023 | Chan | B01D 29/6476 | 210/405 |
| 2023/0166306 A1* | 6/2023 | Svehag | B65G 45/005 | 134/8 |
| 2023/0194081 A1* | 6/2023 | Kim | B30B 9/128 | 210/175 |
| 2023/0257277 A1* | 8/2023 | Hiranaka | B03B 5/48 | 423/555 |

FOREIGN PATENT DOCUMENTS

| | | | | |
|---|---|---|---|---|
| CN | 201309880 Y * | 9/2009 | | |
| CN | 101584948 A * | 11/2009 | | |
| CN | 201404726 Y * | 2/2010 | B30B 9/14 | |
| CN | 1736695 B * | 6/2010 | B30B 9/26 | |
| CN | 202131196 U * | 2/2012 | | |
| CN | 105833592 A * | 8/2016 | B01D 29/48 | |
| CN | 105999800 A * | 10/2016 | C02F 11/121 | |
| CN | 205730534 U * | 11/2016 | | |
| CN | 106914047 A * | 7/2017 | B01D 29/25 | |
| CN | 106955517 A * | 7/2017 | B01D 29/46 | |
| CN | 107471717 A * | 12/2017 | B30B 9/16 | |
| CN | 207187241 U * | 4/2018 | | |
| CN | 108159770 A * | 6/2018 | B01D 33/15 | |
| CN | 207980613 U * | 10/2018 | | |
| CN | 216155724 U * | 4/2022 | B30B 9/166 | |
| EP | 2025383 A1 * | 2/2009 | B01D 29/828 | |
| EP | 4144517 A1 * | 3/2023 | C02F 11/125 | |
| EP | 4144517 B1 * | 7/2024 | B01D 29/94 | |
| JP | 2000246298 A * | 9/2000 | | |
| JP | 2003033896 A * | 2/2003 | B30B 9/26 | |
| JP | 2003136289 A * | 5/2003 | B30B 9/26 | |

(56)        References Cited

FOREIGN PATENT DOCUMENTS

| | | | | |
|---|---|---|---|---|
| JP | 2005230852 A | * | 9/2005 | |
| KR | 200424856 Y1 | * | 8/2006 | ............... B30B 9/26 |
| KR | 102145039 B1 | * | 8/2020 | ............ B04B 11/08 |
| KR | 102288764 B1 | * | 8/2021 | ............. B30B 9/26 |
| WO | WO-2017206174 A1 | * | 12/2017 | ............. C02F 11/12 |
| WO | WO-2018010109 A1 | * | 1/2018 | ............. C02F 11/12 |

* cited by examiner

16

161

161

MULTI-PLATE OR LAMINATED SCREW PRESS

CROSS-REFERENCE TO RELATED APPLICATIONS

This application claims the benefit of priority from Chinese Patent Application No. 202122105634.1, filed on Sep. 2, 2021. The content of the aforementioned application, including any intervening amendments thereto, is incorporated herein by reference in its entirety.

TECHNICAL FIELD

This application relates to solid-liquid separation equipment, and more particularity to a laminated spiral dewatering equipment having a detachable driving device.

BACKGROUND

Chinese patent application No. 201710239689.7 discloses a multi-shaft laminated spiral solid-liquid separation machine with pendulum movement, in which a fixed ring and a movable ring are stacked together to form a cavity, and two or more spiral shafts pass through the cavity. Under the action of an external drive, an upper end of the movable ring is driven to perform up-down reciprocating linear motion, and a lower end of the movable ring is driven to perform reciprocating pendulum motion.

However, when a driving device is arranged under the filtration cavity, it is difficult to observe the operation condition, and perform maintenance and repair, and it also fails to achieve the rapid assembly and disassembly. The leaking sludge will be accumulated at a bottom of the equipment. Furthermore, since the upper end of the movable ring only performs up-down linear motion, it is difficult to remove the leaking sludge accumulated at a top of the equipment by means of the motion of the movable ring itself.

When the driving device is arranged above the filtration cavity, a secondary driving rod at the bottom is driven to swing with a positioning rod at the top as the center. Since a distance between a primary driving rod and the positioning rod is shorter than a distance between the secondary driving rod and the positioning rod, the driving drive motor is prone to overload, and the limit hole for limiting the positioning rod may be exposed to an excessive force to suffer wear and deformation. Moreover, the primary driving rod and the spiral shafts share the same drive motor, and are driven by a gear mechanism, which is adverse to quick installation and disassembly.

SUMMARY

An object of the present disclosure is to provide a laminated spiral dewatering equipment having a detachable driving device to facilitate the observation, regular maintenance, and quick installation and disassembly, and reduce the accumulation of leaking sludge at the bottom.

Technical solutions of the disclosure are described as follows.

This application provides a laminated spiral dewatering equipment, comprising:
  a filtration cavity;
  at least one spiral shaft;
  a driving device; and
  a plurality of supporting plates;

wherein the plurality of supporting plates are configured to support and position the filtration cavity, the at least one spiral shaft and the driving device;

the at least one spiral shaft penetrates through the filtration cavity; one end of the filtration cavity is configured as a feeding end, and the other end of the filtration cavity is configured as a discharging end; the feeding end is provided with a sludge feeding box; and the discharging end is provided with a sludge discharging box;

the filtration cavity comprises a first closed ring piece group consisting of a plurality of first closed ring pieces and a second closed ring piece group consisting of a plurality of second closed ring pieces; the second closed ring piece group is different from the first closed ring piece group in motion state; a first gasket is provided between adjacent first closed ring pieces and/or a second gasket is provided between adjacent second closed ring pieces; a thickness of the first gasket is greater than a thickness of each of the plurality of second closed ring piece, and a thickness of the second gasket is greater than a thickness of each of the plurality of first closed ring pieces such that a gap is formed between adjacent first closed ring pieces and between adjacent second closed ring pieces, respectively;

the first closed ring piece group is configured to be driven by the driving device to move; and the second closed ring piece group is connected to the plurality of supporting plates to keep fixed, or is driven by the driving device to move with a relative displacement with respect to the first closed ring piece group to render the gap unblocked;

when the number of the at least one spiral shaft is equal to or larger than two, two or more spiral shafts are arranged side by side inside the filtration cavity; and a blade of one of adjacent two spiral shafts is close to a central axis of the other of adjacent two spiral shafts;

the driving device comprises a primary driving rod, a secondary driving rod, a positioning rod, at least one eccentric device and a movable transmission ring;

the primary driving rod is connected to a drive motor, or the primary driving rod and the at least one spiral shaft share the same drive motor through a transmission mechanism;

the primary driving rod is supported by at least two of the plurality of supporting plates; and the primary driving rod is provided with the at least one eccentric device;

the primary driving rod is arranged above the secondary driving rod; each of the at least one eccentric device is connected to one of the plurality of first closed ring pieces through a driving plate; the driving plate is integrally formed with each of the plurality of first closed ring pieces; and each of the plurality of first closed ring pieces with the driving plate is configured as the movable transmission ring;

the secondary driving rod is sleevedly arranged at an upper end of the first closed ring piece group, and the positioning rod is sleevedly arranged at a lower end of the first closed ring piece group, such that the plurality of first closed ring pieces in the first closed ring piece group are connected as a whole; and the transmitting mechanism or the drive motor is configured to drive the primary driving rod to move; the at least one eccentric device on the primary driving rod is configured to drive the secondary driving rod to circumferentially reciprocate in a first avoiding hole of each of the plurality of supporting plates, and drive the positioning rod to perform a up-down reciprocating linear motion in a linear limiting hole of each of the plurality of supporting plates, such that the upper end of the first closed ring piece group is driven to circumferentially reciprocate, and the lower end of the first closed ring piece group is driven to perform an up-down reciprocating linear motion.

In some embodiments, an upper end of each of the plurality of supporting plates is provided with a first opening; an upper end of the driving plate is provided with a second opening;

a middle section of the primary driving rod is detachably fixed on front and rear sides of the first opening through a pair of U-shaped shaft sleeves, wherein the pair of U-shaped shaft sleeves are buckled oppositely to form a round hole in which the primary driving rod is sleevedly arranged;

one end of the primary driving rod is connected to the drive motor; and the other end of the primary driving rod is fixed on each of the plurality of supporting plates through a shaft sleeve;

the primary driving rod is detachably connected to the second opening of the driving plate through the at least one eccentric device; and each of the at least one eccentric device comprises an eccentric wheel, a bearing and a bearing base; the eccentric wheel is sleevedly arranged on the primary driving rod; the bearing is sleevedly arranged on the eccentric wheel; and the bearing base is configured to cover the bearing; and the bearing base is fixedly connected to the upper end of the driving plate.

In some embodiments, each of the plurality of supporting plates is provided with a second avoidance hole to allow the positioning rod to pass through; and front and rear sides of the second avoidance hole are respectively fixedly provided with a U-shaped polyoxymethylene plate or nylon plate, so as to form the linear limiting hole configured to allow the positioning rod to straightly move up and down.

In some embodiments, a third gasket is sleevedly arranged on the positioning rod, and the third gasket is circular; and the third gasket is embedded in the second avoidance hole, and is limited by the U-shaped polyoxymethylene plate or nylon plate to reduce wear between the positioning rod and each of the plurality of supporting plates.

In some embodiments, an inner contour of each of the plurality of second closed ring pieces is provided with a protrusion and a recess.

In some embodiments, an inner contour of each of the plurality of first closed ring pieces is provided with a protrusion and a recess.

In some embodiments, a cross section of the sludge feeding box is polygonal; each edge of the cross section of the sludge feeding box is almost tangent to a blade of each of the at least one spiral shaft; angles of the cross section of the sludge feeding box are respectively provided with a baffle; and a side of the baffle is close to the blade of each of the at least one spiral shaft.

In some embodiments, a portion of the filtration cavity close to the discharging end is connected to a compression part; a cross section of the compression part is polygonal; each edge of the cross section of the compression part is almost tangent to a blade of each of the at least one spiral shaft; angles of the cross section of the compression part are respectively provided with a baffle; and a side of the baffle is close to the blade of each of the at least one spiral shaft.

In some embodiments, upper and lower ends of two sides of each of the plurality of supporting plates are respectively provided with a notch configured for installation of a spray pipe, so as to spray the filtration cavity from four directions.

In some embodiments, a splash shield is inserted between adjacent two supporting plates through a slot, and is respectively provided with at two sides of the filtration cavity.

The present disclosure has the following beneficial effects.

The driving device such as the primary driving rod and the eccentric device is detachably arranged above the filtration cavity, not only preventing the driving device from eroded by filtrate for a long time, so as to reduce failure rate and improve a duration, but also facilitating the observation and quick disassembly and installation during maintenance.

The upper end of the first closed ring piece group (movable ring) can circumferentially reciprocate, and the lower end of the first closed ring piece group can perform a up-down reciprocating linear motion, so as to leak sludge timely cleaned due to a large swing angle of the upper end of the movable ring. In addition, the lower end of the first closed ring piece group is free from barriers such as primary driving rod and eccentric device, achieving an unblocked gap and reduce the accumulation of leaking sludge at the bottom.

The inner contour of the second closed ring piece group (fixed ring) and the movable ring have a protrusion and a recess. A cross section of the sludge feeding box and the compression part are polygonal and provided with baffles, which provide resistances to materials, avoiding the same rotation, such that the materials can be pushed forward smoothly.

The filtration cavity is sprayed by water from four directions by spray pipes, leading to a clean surface of the filtration cavity and an unblocked gap for discharging the filtrate.

Adjacent supporting plates are provided with splash shield therebetween, such that a top and a side of the filtration cavity are enclosed, preventing splashing of filtrate and spray water from a side and top of the filtration cavity.

BRIEF DESCRIPTION OF THE DRAWINGS

The disclosure will be described in detail below with reference to the embodiments and accompanying drawings.

DETAILED DESCRIPTION OF EMBODIMENTS

Figure 1:
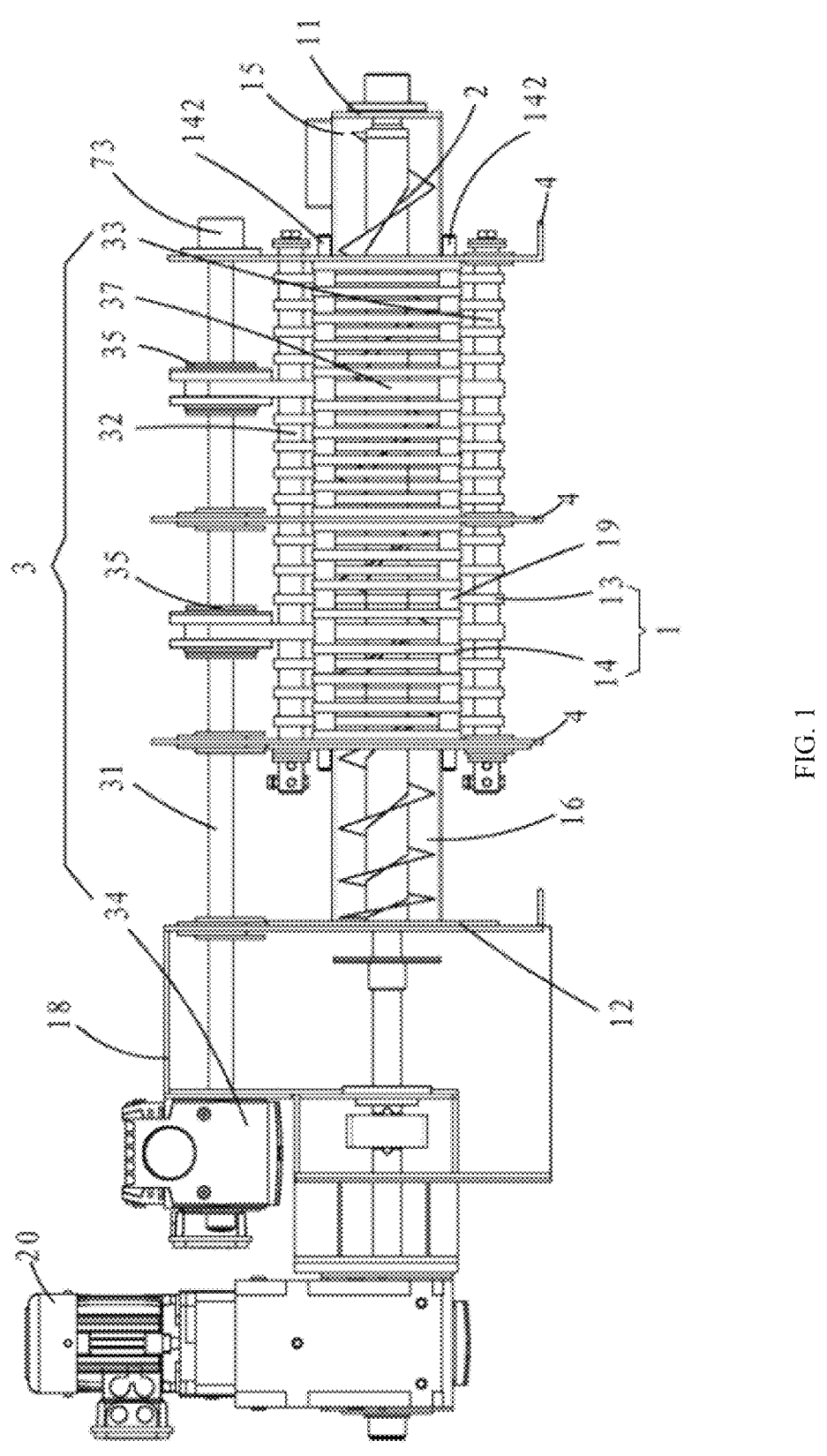
FIG. 1 is a front view of a laminated spiral dewatering equipment according to an embodiment of the present disclosure.
Figure 2:
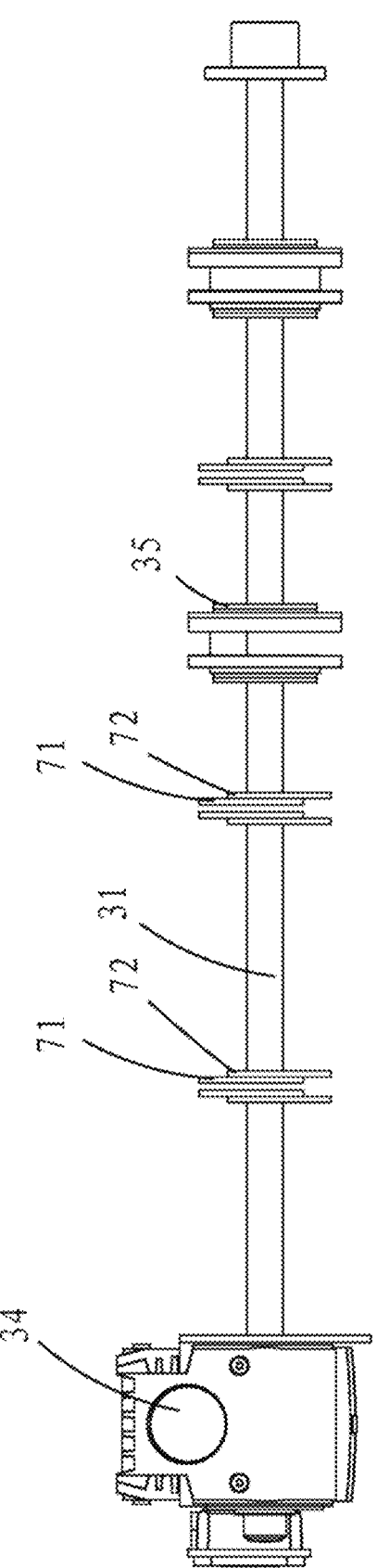
FIG. 2 schematically depicts a structure of a detachable driving device according to an embodiment of the present disclosure.
Figure 3:
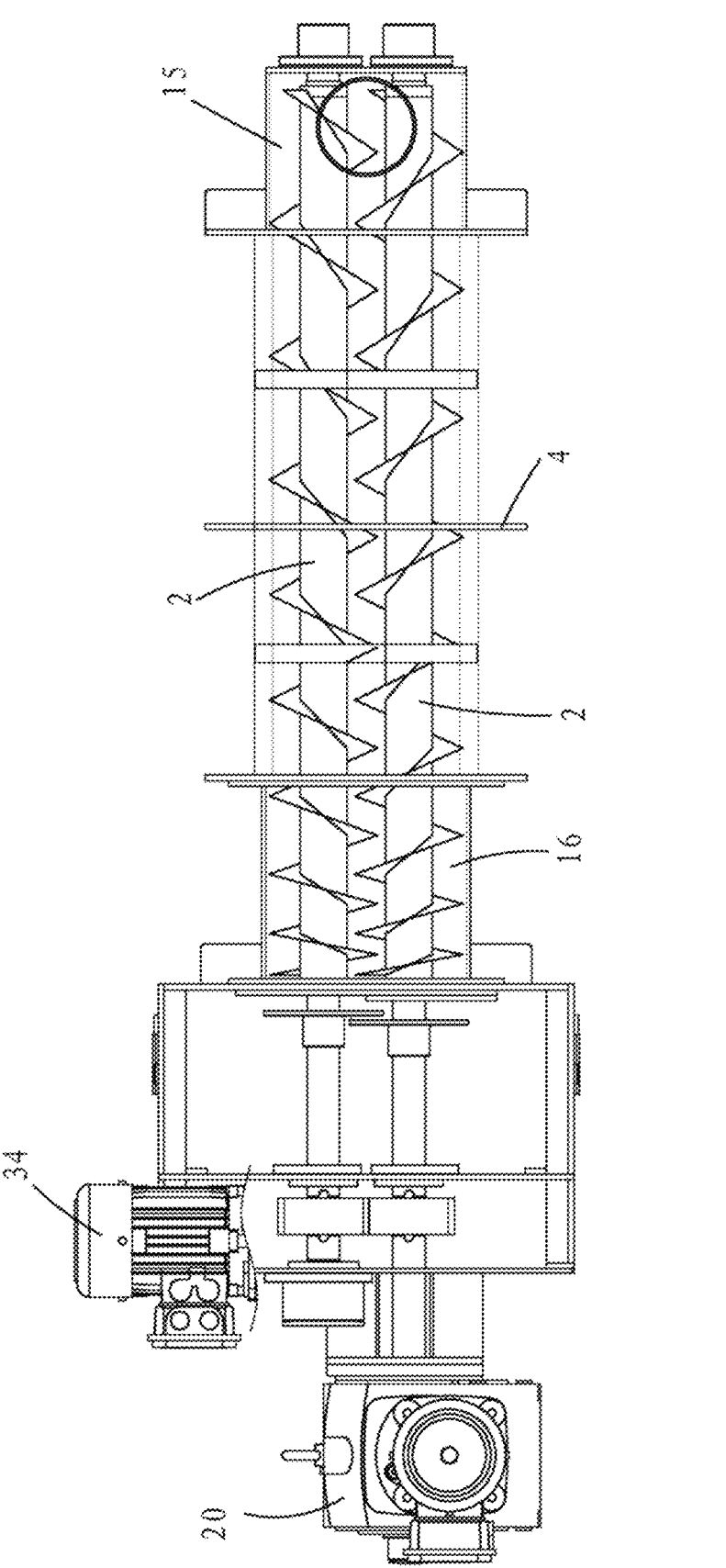
FIG. 3 is a top view of the laminated spiral dewatering equipment without the driving device according to an embodiment of the present disclosure.
Figure 4:
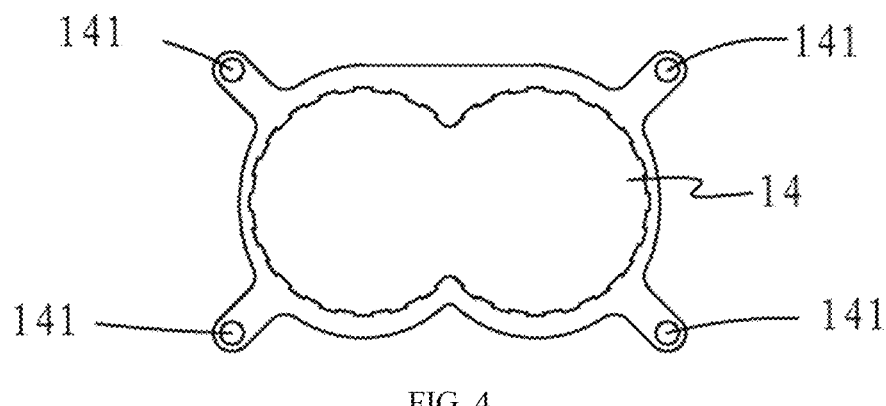
FIG. 4 schematically depicts a structure of a second closed ring piece (fixed ring) according to an embodiment of the present disclosure.
Figure 5:
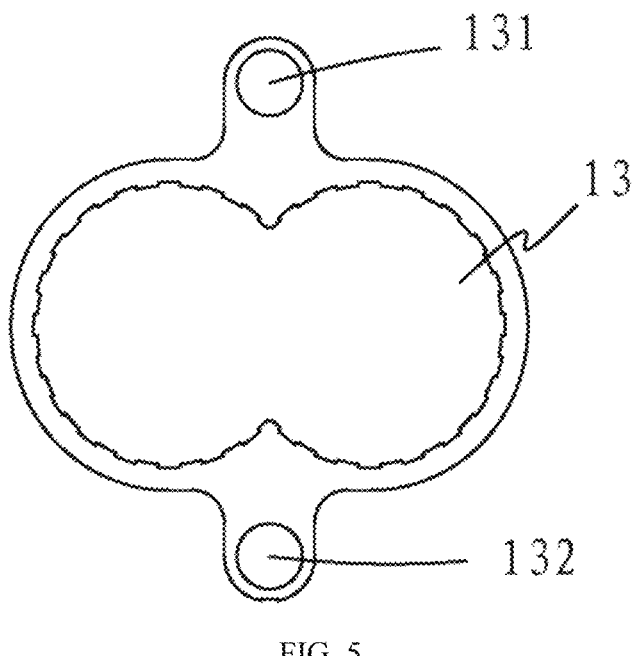
FIG. 5 schematically depicts a structure of a first closed ring piece (movable ring) according to an embodiment of the present disclosure.
Figure 6:
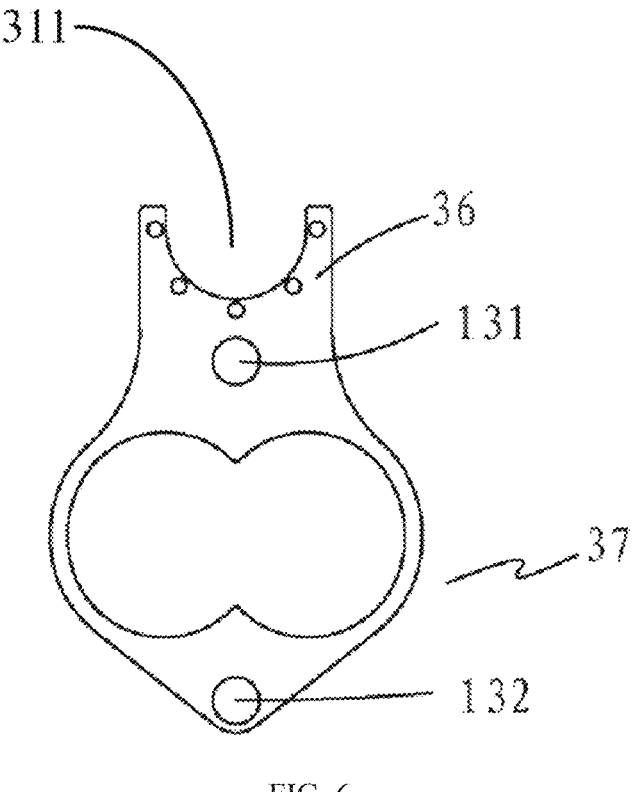
FIG. 6 schematically depicts a structure of a movable transmission ring according to an embodiment of the present disclosure.
Figure 7:
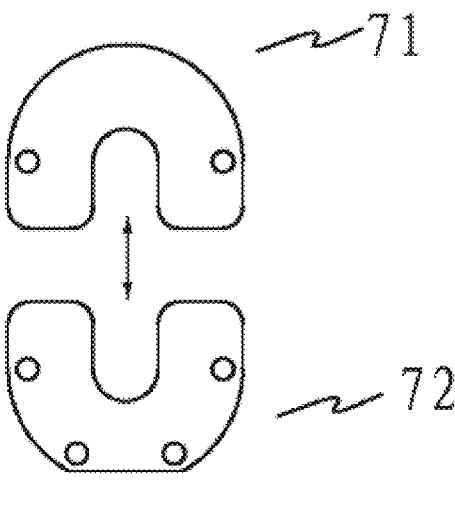
FIG. 7 structurally depicts a primary driving rod and a pair of mounting parts (U-shaped shaft sleeves) at an upper end of a supporting plate according to an embodiment of the present disclosure.

Illustrated in FIGS. 1-9 is a laminated spiral solid-liquid separation equipment, including a filtration cavity 1, at least one spiral shaft 2, a driving device 3 and multiple supporting plates 4.

The supporting plates 4 are configured to support and position the filtration cavity 1, the at least one spiral shaft 2 and the driving device 3. The at least one spiral shaft 2 penetrates through the filtration cavity 1. One end of the filtration cavity 1 is configured as a feeding end 11. The other end of the filtration cavity 1 is configured a discharging end 12. The feeding end 11 is provided with a sludge feeding box 15. The discharging end 12 is provided with a sludge discharging box 18.

The filtration cavity 1 includes a first closed ring piece group 13 consisting of a plurality of first closed ring pieces and a second closed ring piece group 14 consisting of a plurality of second closed ring pieces. The first closed ring pieces 13 are movable ring, and can be driven by the driving device 3. The second closed ring pieces 14 are fixed ring, and are fixed onto the supporting plates 4 by penetrating four columns 142 through four holes 141 on the second closed ring pieces. A first gasket 19 is provided between adjacent second closed ring pieces 14. The first gasket 19 is fixed by a corresponding column 141. A thickness of the first gasket 19 is greater than a thickness of each of the first closed ring pieces 13 such that a gap is formed between adjacent second closed ring piece 14 and first closed ring piece 13.

In an embodiment, the number of the at least one spiral shaft 2 is two. The two spiral shafts 2 are arranged side by side inside the filtration cavity 1. A blade of one of the two spiral shafts 2 is close to a central axis of the other of the two spiral shafts 2. A shape of the first closed ring pieces 13 and a shape of the second closed ring pieces 14 are matched with a shape of the two spiral shafts 2. An inner contour of each first closed ring pieces 13 and that of the second closed ring pieces 14 both have a protrusion and a recess. When transmitted by the two spiral shafts 2, a material is easy to be pushed forward due to a resistance of an inner wall of the filtration cavity 1. One of the two spiral shafts 2 is driven by the driving device 20, and is configured to drive the other spiral shaft 2 to rotate through gear-driven. A pitch of the spiral shafts 2 decreases from the feeding end 11 towards the discharging end 12. In an embodiment, the number of the at least one spiral shaft 2 is one or larger than one.

In an embodiment, the driving device 3 includes a primary driving rod 31, a secondary driving rod 32, a positioning rod 33, a drive motor 34, multiple eccentric devices 35 and a movable transmission ring 37.

The primary driving rod 31 is arranged above the filtration cavity 1, and is supported by the supporting plates 4. The primary driving rod 31 is provided with the multiple eccentric devices 35 spaced apart.

The primary driving rod 31 is arranged above the secondary driving rod 32. Each of the multiple eccentric devices 35 is connected to one first closed ring piece 13 through a driving plate 36. The driving plate 36 is integrated with the first closed ring piece 13. A first closed ring pieces 13 is integrally formed with the driving plate 36. The first closed ring pieces 13 with the driving plate 36 is configured as the movable transmission ring 37. A thickness of the movable transmission ring 37 is greater than other first closed ring pieces 13 for strength enhancing.

The first closed ring pieces 13 are each provided with an upper hole 131 and a lower hole 132. The secondary driving rod 32 is sleevedly arranged at the upper hole 131. The positioning rod 33 is sleevedly arranged at the lower hole 132, such that all first closed ring pieces 13 are connected.

The drive motor 34 is configured to drive the primary driving rod 31 to move. The multiple eccentric devices 35 on the primary driving rod 31 are configured to drive the secondary driving rod 32 to circumferentially reciprocate in a first avoiding hole 41 of each of the supporting plates 4, and drive the positioning rod 33 to perform a up-down reciprocating linear motion in a linear limiting hole, so as to drive an upper end of the first closed ring piece group 13 to circumferentially reciprocate, and a lower end of the first closed ring piece group 13 to perform the up-down reciprocating linear motion.

Figure 8:
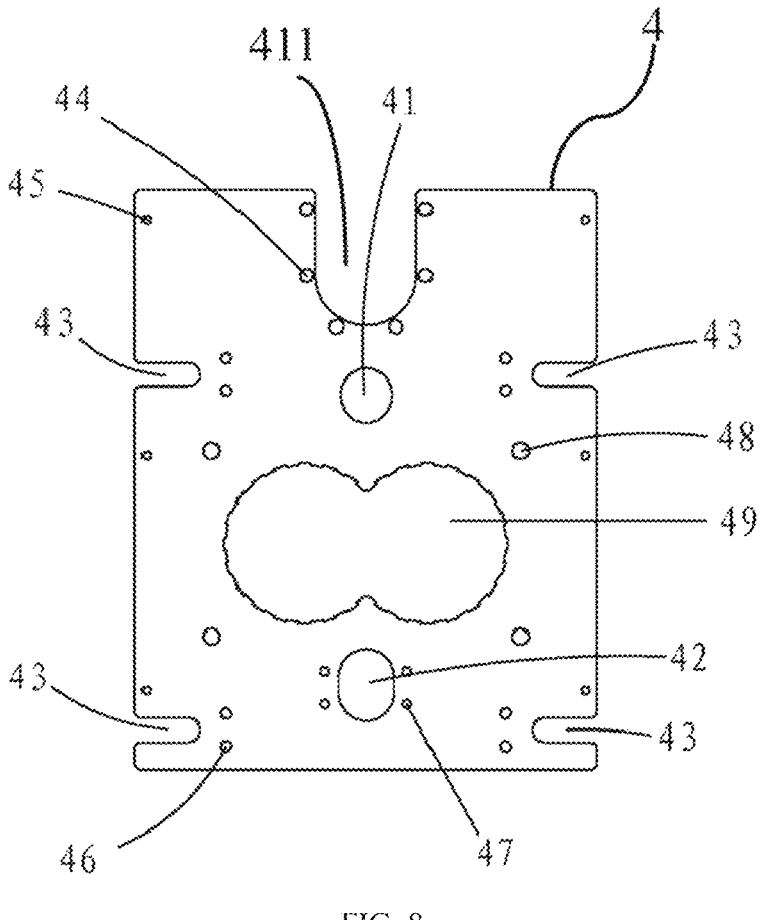
FIG. 8 schematically depicts a structure of the supporting plate according to an embodiment of the present disclosure.
Figure 9:
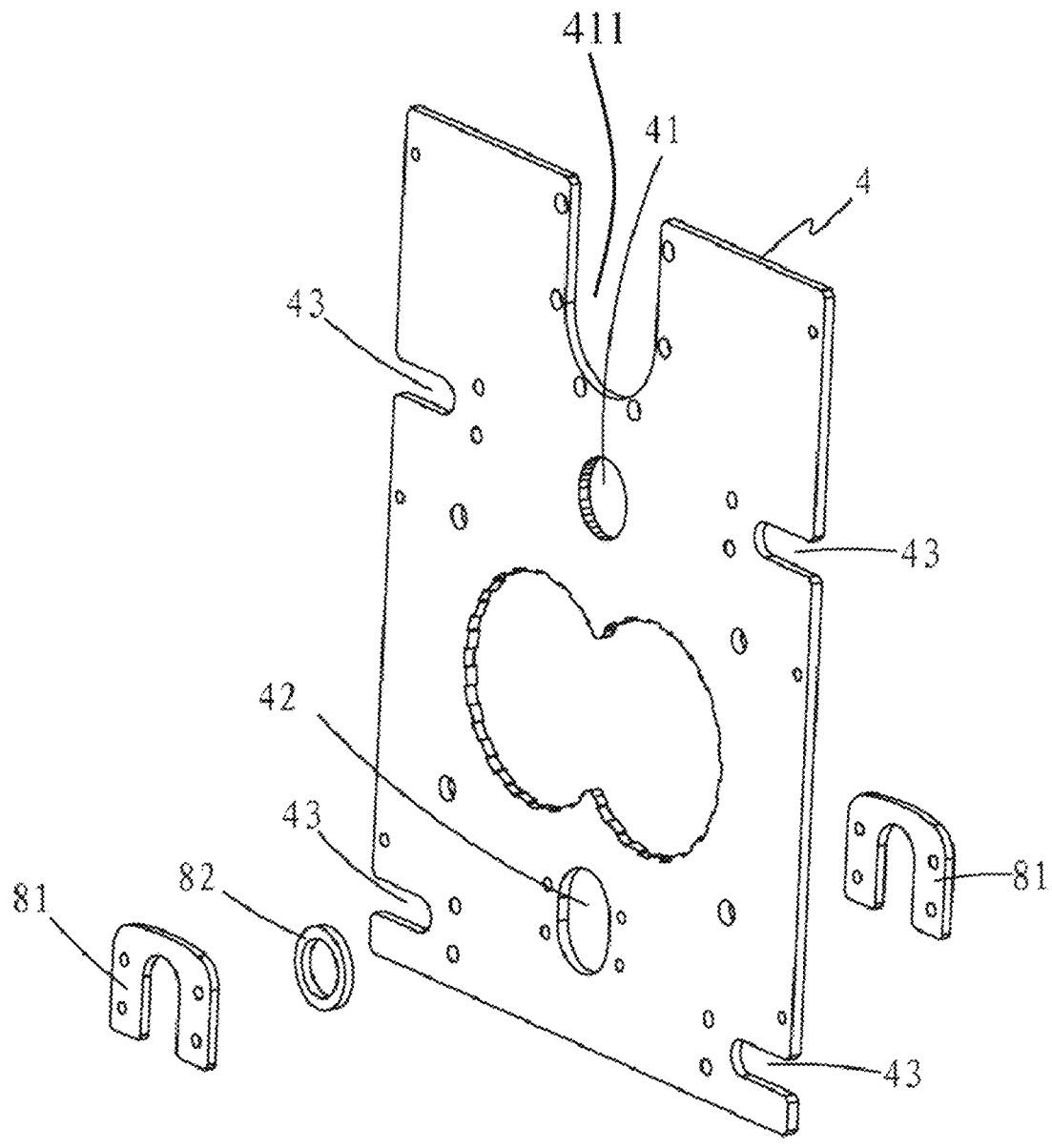
FIG. 9 illustrates assembly between the supporting plate and a positioning rod according to an embodiment of the present disclosure.

As shown in FIGS. 8 and 9, each of the supporting plates 4 is provided with a second avoidance hole 42 to allow the positioning rod 33 to pass through. Front and rear sides of the second avoidance hole 42 are respectively fixedly provided with a U-shaped polyoxymethylene plate or nylon plate 81 (U-shaped guideway), so as to form the linear limiting hole configured to allow the positioning rod 33 to straightly move up and down to reduce abrasion. A second gasket 82 is sleevedly arranged on the positioning rod 33. The second gasket 82 is embedded in the second avoiding hole 42, and is limited by the U-shaped polyoxymethylene or nylon plate 81 to further reduce the abrasion between positioning rod 33 and the supporting plates 4.

In an embodiment, an upper end of each of the supporting plates 4 is provided with a first opening 411. An upper end of the driving plate 36 of the movable transmission ring 37 is provided with a second opening 311. A middle section of the primary driving rod 31 is detachably fixed on front and rear sides of the first opening 411 through a pair of U-shaped polyoxymethylene components or nylon shaft sleeves 71 and 72 (other abrasion-proof materials are feasible). The pair of U-shaped polyoxymethylene components or nylon shaft sleeves 71 and 72 are buckled oppositely to form a round hole in which the primary driving rod 31 is sleevely arranged. One end of the primary driving rod 31 is connected to the drive motor 34. The other end of the primary driving rod 31 is fixed on the supporting plates 4 through a shaft sleeve 73. The drive motor 34 is arranged of the sludge discharging box 18.

Figure 10:
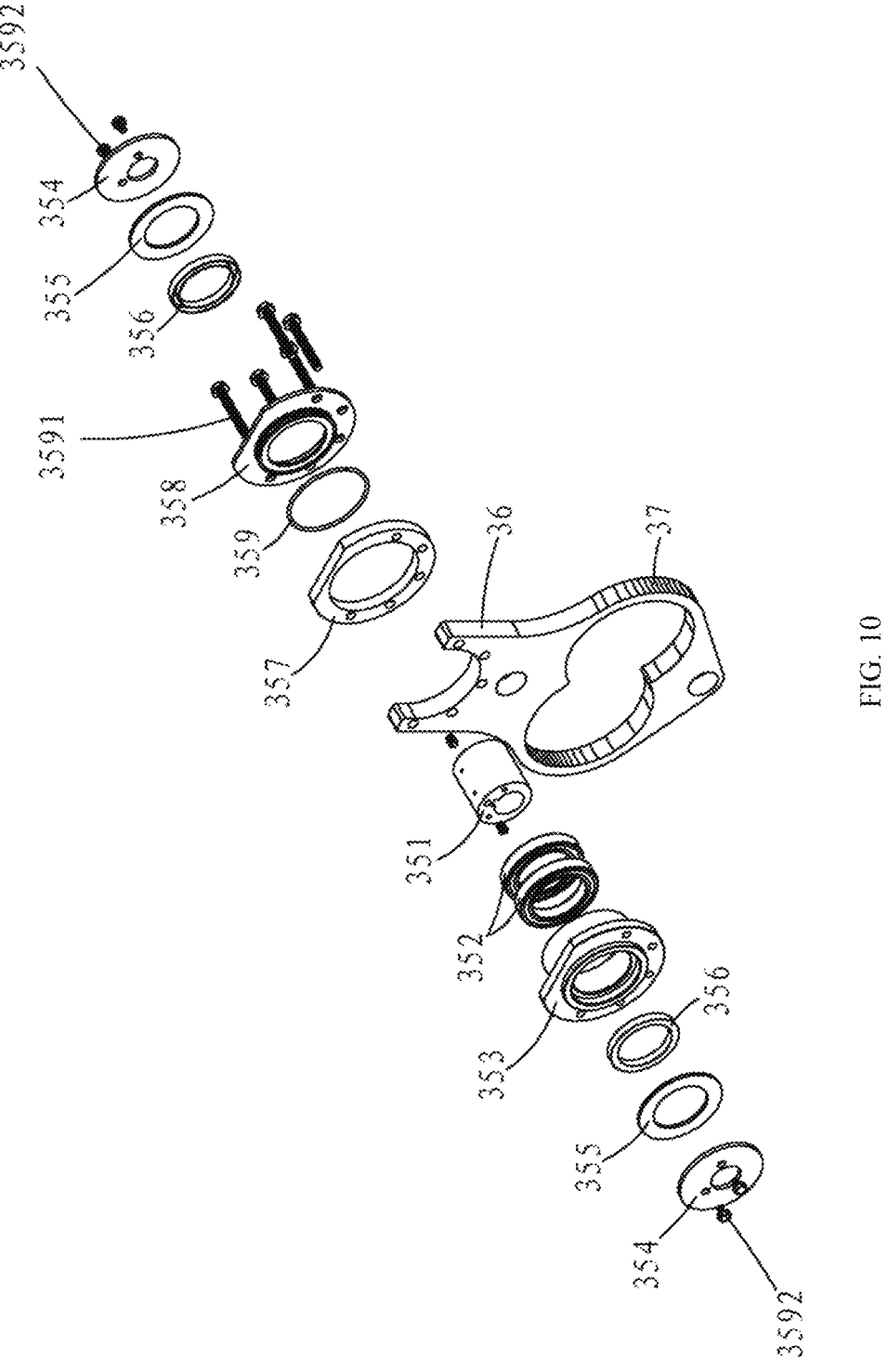
FIG. 10 is an exploded view illustrating an assembly of an eccentric device and the movable transmission ring according to an embodiment of the present disclosure.
Figure 11:
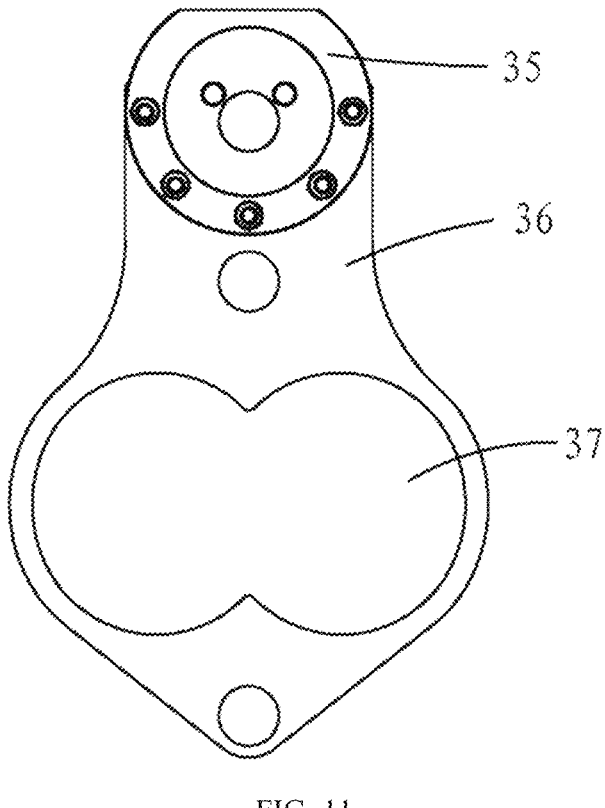
FIG. 11 is a front view of the eccentric device and the movable transmission ring after assembled according to an embodiment of the present disclosure.
Figure 12:
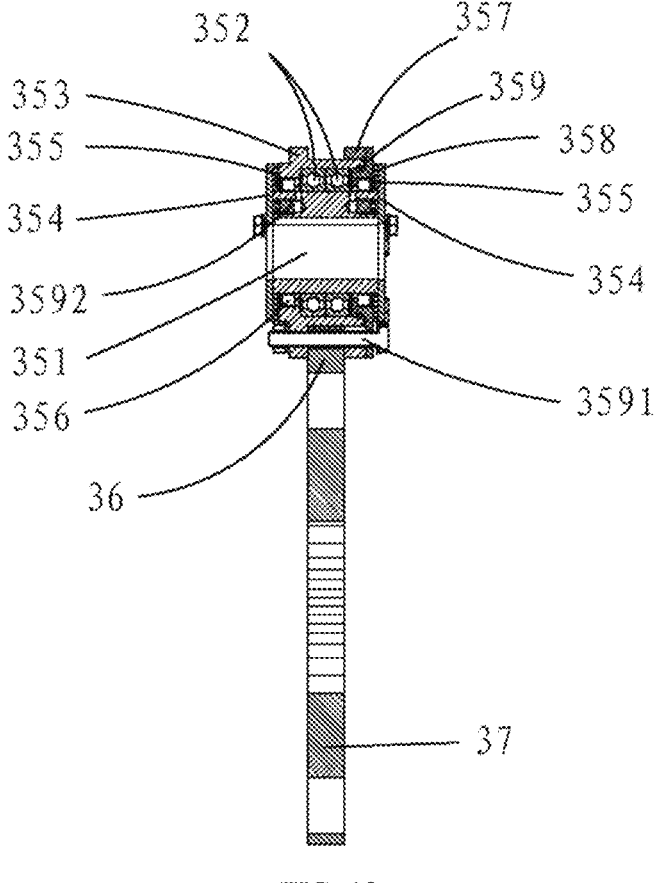
FIG. 12 is a section view of the eccentric device and the movable transmission ring after assembled according to an embodiment of the present disclosure.

The primary driving rod 31 is detachably connected to the second opening 311 of the upper end of the driving plate 36 through the multiple eccentric devices 35. Each of the eccentric devices 35 includes an eccentric wheel 351, a bearing 352, a bearing base 353, two eccentric wheel baffles 354, two nylon sleeves 355, two oil seals 356, a bearing base ring 357, a bearing base cover plate 358 and a seal ring 359. An assembly method of the eccentric device and the transmitting ring is shown as FIGS. 10-12. The primary driving rod 31 and each of the eccentric wheel 351 are both provided with a key and a keyway. The keyway of the eccentric wheel 351 is clamped on the key of the primary driving rod 31. The bearing 352 is sleevely arranged on the eccentric wheel 351 and make an interference fit. The bearing base 353 and the bearing base cover plate 358 are configured to cover the bearing 352. A first screw 3591 sequentially passes through the bearing base cover plate 358, the bearing base ring 357, the driving plate 36 and the bearing base 353 for locking. A space between the bearing base 353 and the bearing base cover plate 358 is sealed through the seal ring 359. A gap between the bearing base 353 and the primary driving rod 31 is seal through one of the two oil seals 356. The two nylon sleeves 355 are sleevely arranged at front and rear sides of the bearing base 353, respectively. An exterior side of each of the two nylon sleeves 355 is covered by one of the two eccentric wheel baffles 354. Each of the two eccentric wheel baffles 354 is locked on the eccentric wheel 351 through a second screw 3592, and is capable of rotating with the eccentric wheel 351. The two eccentric wheel baffles 354 are configured to prevent the eccentric wheel 351 from out of position. The two nylon sleeves 355 are configured to prevent the bearing base 353, the bearing base cover plate 358 and the two eccentric wheel baffles 354 from dry grinding therebetween.

Figure 13:
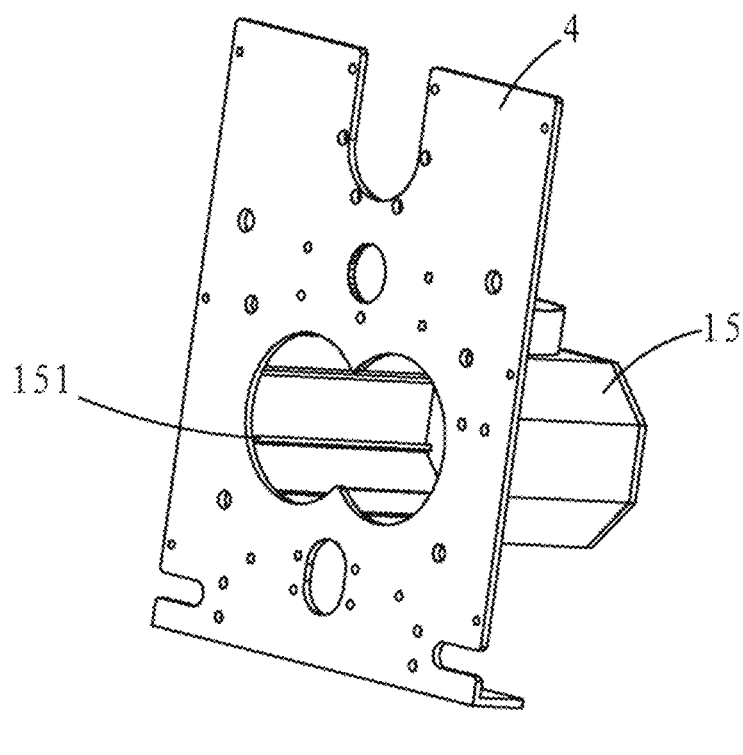
FIG. 13 schematically depicts a structure of a sludge feeding box according to an embodiment of the present disclosure.
Figure 14:
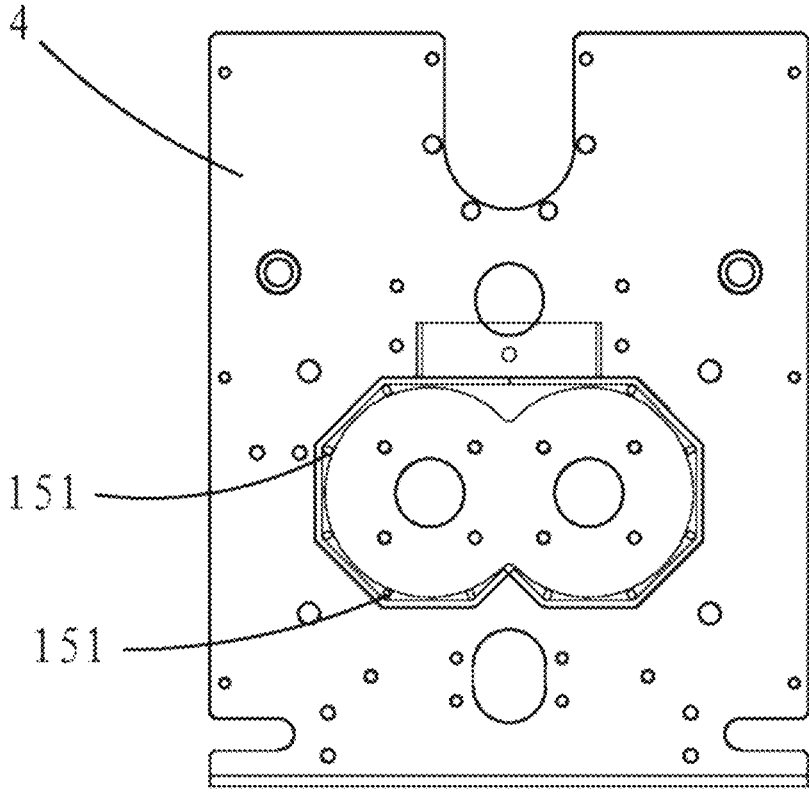
FIG. 14 is a front view of the sludge feeding box according to an embodiment of the present disclosure.
Figure 15:
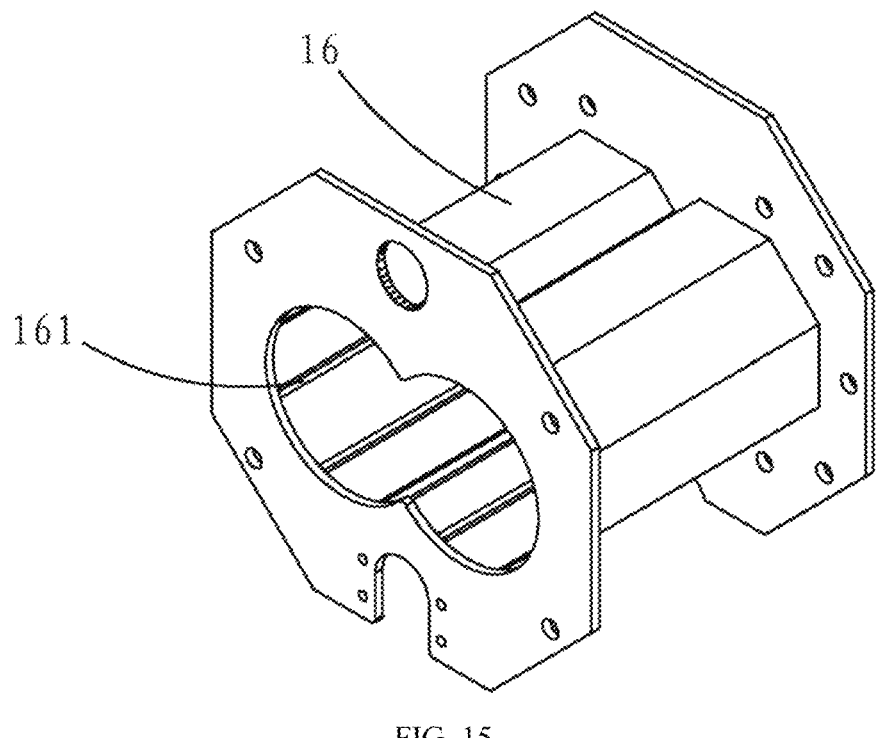
FIG. 15 schematically depicts a structure of a compression part according to an embodiment of the present disclosure.
Figure 16:
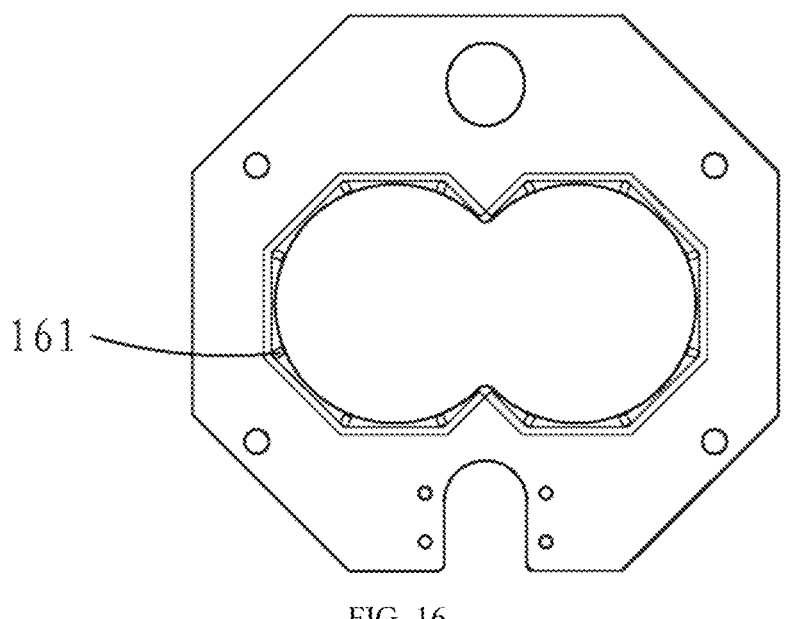
FIG. 16 is a front view of the compression part according to an embodiment of the present disclosure.

As shown in FIGS. 13 and 14, a cross section of the sludge feeding box 15 is polygonal. Each edge of the cross section of the sludge feeding box is almost tangent to the blade of each of the two spiral shafts 2. Angles of the cross section of the sludge feeding box are respectively provided with a first baffle 151. The first baffle 151 is close to the blade. The discharging end of the filtration cavity 1 is connected to a compression part. As shown in FIGS. 15 and 16, a cross section of the compression part 16 is polygonal. Each edge of the cross section of the compression part 16 is almost tangent to the blade of each of the two spiral shafts 2. Angles of the cross section of the compression part 16 are respectively provided with a second baffle 161. The second baffle 161 is close to the blade. Therefore, the material has a resistance to avoid the same rotation.

Figure 17:
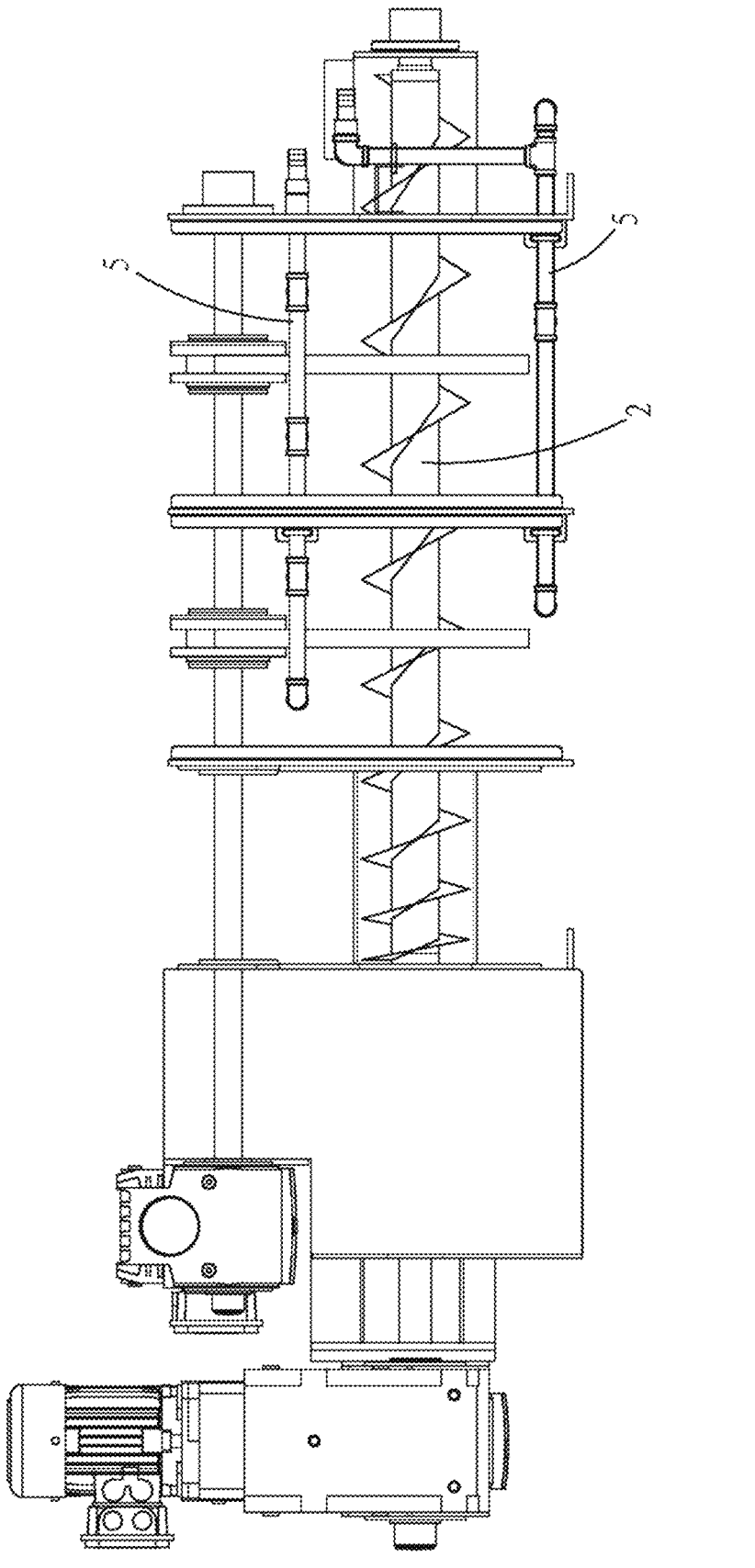
FIG. 17 partially depicts the structure of the laminated spiral dewatering equipment with a spray pipe according to an embodiment of the present disclosure.
Figure 18:
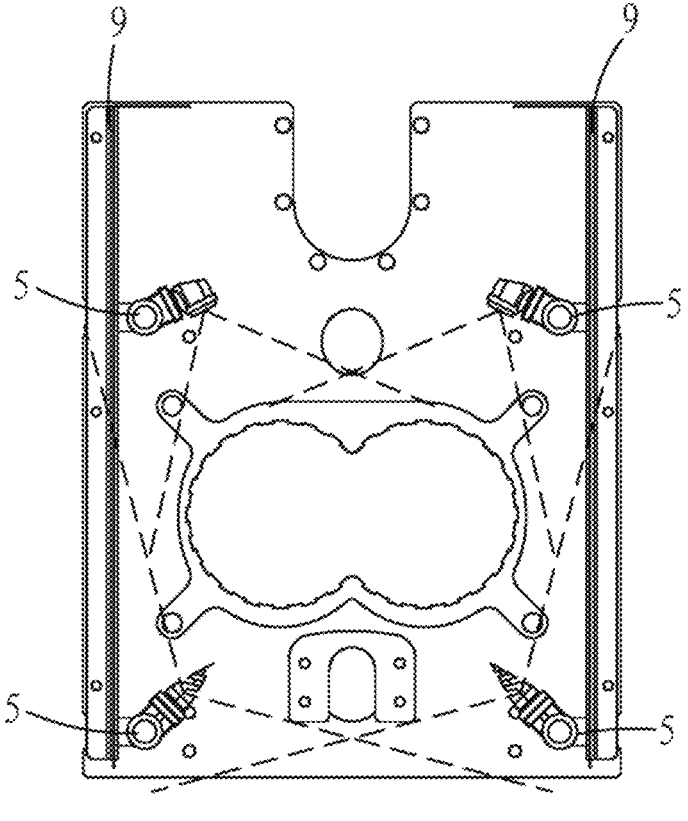
FIG. 18 is a sectional view of the laminated spiral dewatering equipment shown in FIG. 17.

Upper and lower ends of two sides of each of the plurality of supporting plates 4 are respectively provided with a notch 43. As shown in FIGS. 17 and 18, each notch 43 is configured for installation of a spray pipe 5, so as to spray the filtration cavity 1 from four directions.

Figure 19:
FIG. 19 is a front view of a splash shield according to an embodiment of the present disclosure.
Figure 20:
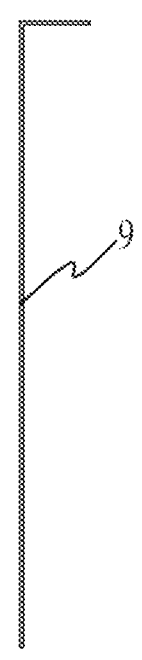
FIG. 20 is a side view of the splash shield according to an embodiment of the present disclosure.
Figure 21:
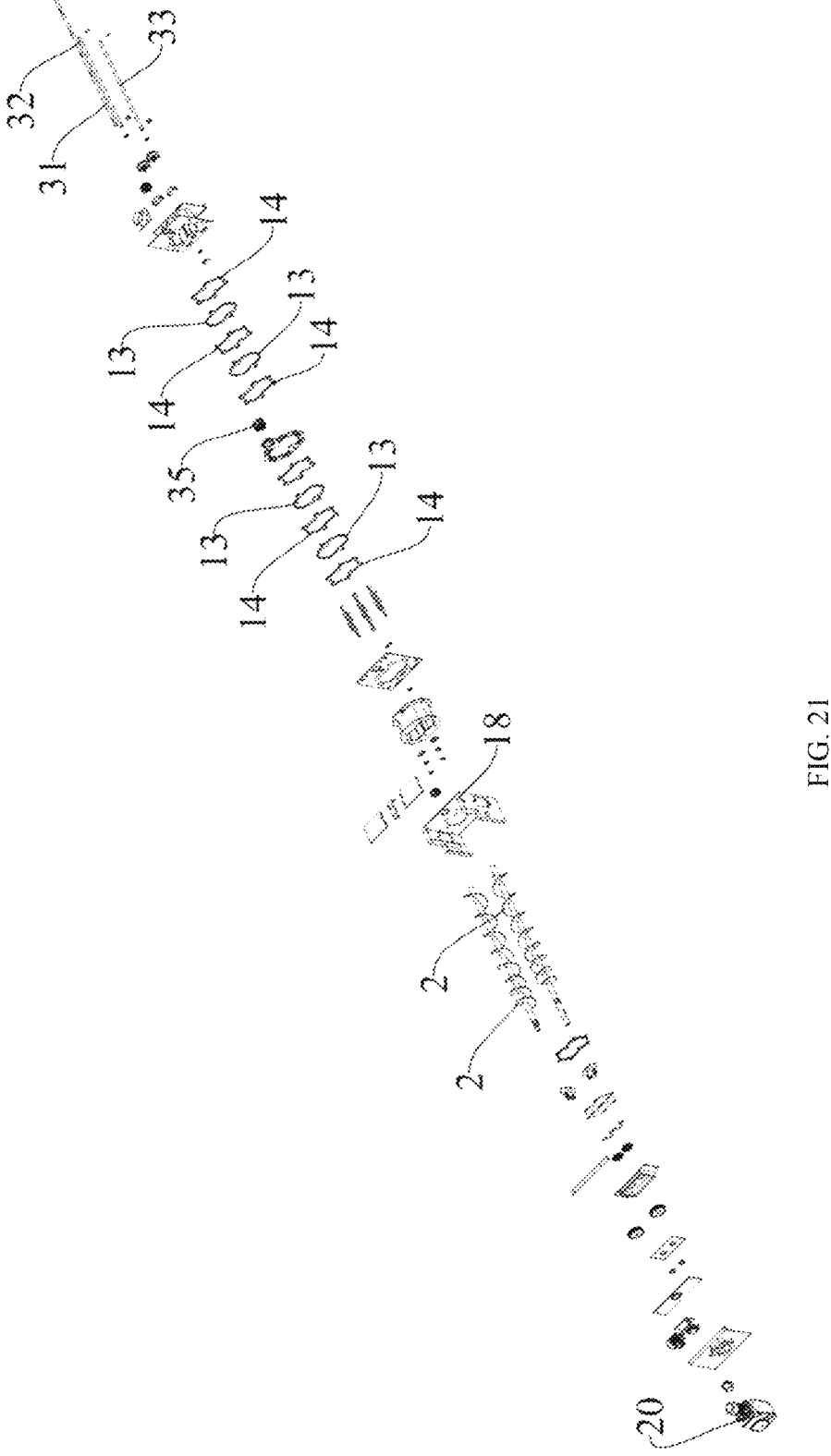
FIG. 21 is an exploded view of the laminated spiral dewatering equipment shown in FIG. 1.

A splash shield 9 is inserted between adjacent supporting plates 4 through a slot. The slot is formed by arranging two L-shaped steels spaced apart at the supporting plates 4. As shown in FIGS. 19 and 20, the splash shield 9 is a L-shaped plate, preventing splashing of filtrate and spray water from a side and top of the filtration cavity 1.

As shown in FIG. 8, each of the supporting plates 4 is further provided with a U-shaped shaft sleeve fixing hole 44, a baffle fixing hole 45, a spray pipe fixing hole 46, a U-shaped guideway fixing hole 47, a fixed ring fixing hole 48, multiple mounting holes and a screw shaft through hole 49.

An operating process of the abrasion-free laminated spiral solid-liquid separation equipment is shown as follows.

The material enters the sludge feeding box 15 through a feeding port, and pushed by the two spiral shafts 2 arranged inside the filtration cavity 1 side by side. Therefore, even the material is easily wound or cemented, the material will be scraped by the two spiral shafts, so as to be smoothly pushed forward due to blocking of the first baffle 151 of the sludge feeding box 15, the recess and protrusion in the fixed ring and the movable ring, and the second baffle 161 of the compression part 16. Since the upper end of the first closed ring piece group 13 circumferentially reciprocates and the lower end of the first closed ring piece group 13 performs the up-down reciprocating linear motion, adjacent first closed ring pieces generates a displacement therebetween to render the gap unobstructed, such that the filtrate can be discharged from the filtration cavity 1 through the gap, and the filter residue can be discharged from the discharging end. During the filtration, a part of the sludge is pushed out of the filtration cavity 1. Since the lower end of the first closed ring piece group 13 only has the positioning rod 33, the filtrate is discharged smoothly. sludge at the upper end of the first closed ring piece group 13 is slid due to the movement of the first closed ring piece group 13. In addition, residual sludge on a surface of filtration cavity 1 is sprayed for washing from four directions by the spray pipe 5, leading to a clean surface of filtration cavity 1 and an unblocked gap for discharging the filtrate. The filtrate discharged through the filtration cavity 1 and water sprayed by the spray pipe 5 are kept inside the solid-liquid separation equipment by the splash shield 9 and flow directly to a filtrate collecting groove below the solid-liquid separation equipment.

Described above are merely some embodiments of the present disclosure, which are not intended to limit the disclosure. It should be understood that various changes and modifications made by those skilled in the art based on the embodiments provided herein without paying creative effort should fall within the scope of the disclosure defined by the appended claims.

What is claimed is:

1. A multi-plate screw press for dewatering sludges, comprising:
    a plurality of first movable closed rings, each including an upper hole and a lower hole, the plurality defining a first movable closed ring group;
    a plurality of second fixed closed rings, each including four holes, the plurality defining a second fixed closed ring group;
        wherein the plurality of first movable closed rings and the plurality of second fixed closed rings are arranged adjacent to each other in an alternating fashion, collectively defining an elongate longitudinal filtration cavity open at each end, one end of the filtration cavity is configured as a feeding end, and the other end of the filtration cavity is configured as a discharging end, the feeding end is provided with a sludge feeding box, and the discharging end is provided with a sludge discharging box;

a first gasket provided between adjacent first movable closed rings;

a second gasket provided between adjacent second fixed closed rings;

wherein a thickness of the first gasket is greater than a thickness of each of the plurality of second fixed closed rings, and a thickness of the second gasket is greater than a thickness of each of the plurality of first movable closed rings such that a gap is formed between adjacent first movable closed rings and between adjacent second fixed closed rings respectively;

at least one spiral shaft extending through the elongate longitudinal filtration cavity;

a plurality of supporting plates connected to each of the second fixed closed rings to keep them fixed, an upper end of each of the plurality of supporting plates is provided with a first opening;

a driving device comprising:

a primary driving rod, a middle section of the primary driving rod is detachably fixed on front and rear sides of the first opening of a respective supporting plate through a pair of U-shaped shaft sleeves, wherein the pair of U-shaped shaft sleeves are buckled oppositely to form a round hole in which the primary driving rod is sleevedly arranged;

a secondary driving rod;

a positioning rod;

at least one eccentric device; and a movable transmission ring comprising a driving plate integrally formed with each of the plurality of first movable closed rings, each including a respective upper hole and lower hole;

wherein:

the primary driving rod is operably connected to a drive motor, the primary driving rod is supported by at least two of the plurality of supporting plates, and the primary driving rod includes the at least one eccentric device, the primary driving rod is arranged above the secondary driving rod, each at least one eccentric device is connected to a corresponding one of the plurality of first movable closed rings through the driving plate, an upper end of the driving plate is provided with a second opening;

the secondary driving rod sleevedly extends through the upper hole of each of the first movable closed rings, the at least one eccentric device on the primary driving rod is connected to the secondary driving rod through the first movable closed ring group;

the positioning rod sleevedly extends through lower hole, end of the plates of each of first movable closed ring piece group, such that the plurality of first movable closed rings in the first movable closed rings group are connected as a whole, and arranged in a first avoidance hole of each of the plurality of supporting plates; and wherein the first movable closed ring group is configured to be collectively moved by the driving device to move relative to the second fixed closed ring group that is fixedly connected to the plurality of supporting plates to keep fixed, to render the gap blocked or unblocked.

2. The multi-plate screw press of claim 1, wherein the at least one spiral shaft comprises at least two spiral shafts, each spiral shaft is arranged side by side inside the filtration cavity, and outermost portions of blades of adjacent spiral shafts are substantially adjacent to outermost surfaces of the shaft portion of adjacent spiral shafts.

3. The multi-plate screw press of claim 1, wherein an inner contour of each of the plurality of second fixed closed rings is provided with a protrusion and a recess.

4. The multi-plate screw press of claim 1, wherein an inner contour of each of the plurality of first movable closed rings is provided with a protrusion and a recess.

5. The multi-plate screw press of claim 1, wherein a cross section of the sludge feeding box is polygonal; each edge of the cross section of the sludge feeding box is tangent to a blade of each of the at least one spiral shaft; angles of the cross section of the sludge feeding box are respectively provided with a baffle; and a side of the baffle is adjacent to the blade of each of the at least one spiral shaft.

6. The multi-plate screw press of claim 1, wherein a portion of the filtration cavity adjacent to the discharging end is connected to a compression part; a cross section of the compression part is polygonal; each edge of the cross section of the compression part is tangent to a blade of each of the at least one spiral shaft; angles of the cross section of the compression part are respectively provided with a baffle; and a side of the baffle is close to the blade of each of the at least one spiral shaft.

7. The multi-plate screw press of claim 1, further comprising:

a spray pipe;

wherein upper and lower ends of two sides of each of the plurality of supporting plates are respectively provided with a notch configured for installation of the spray pipe, so as to spray the filtration cavity from four directions.

8. The multi-plate screw press of claim 1, further comprising:

a splash shield;

wherein the splash shield is inserted between adjacent two supporting plates through a slot, and is respectively provided at two sides of the filtration cavity.

* * * * *